US011245635B2

(12) United States Patent
Cagle

(10) Patent No.: US 11,245,635 B2
(45) Date of Patent: *Feb. 8, 2022

(54) FEEDBACK LOOP FOR FRAME MAXIMIZATION

(71) Applicant: T-Mobile USA, Inc., Bellevue, WA (US)

(72) Inventor: Damon Cagle, Maple Valley, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/690,039

(22) Filed: Nov. 20, 2019

(65) Prior Publication Data
US 2020/0092215 A1 Mar. 19, 2020

Related U.S. Application Data

(63) Continuation of application No. 15/857,221, filed on Dec. 28, 2017, now Pat. No. 10,523,575.

(60) Provisional application No. 62/529,378, filed on Jul. 6, 2017.

(51) Int. Cl.
*H04L 12/805* (2013.01)
*H04W 28/06* (2009.01)
*H04L 12/815* (2013.01)
*G06N 20/00* (2019.01)

(52) U.S. Cl.
CPC .......... *H04L 47/365* (2013.01); *H04W 28/06* (2013.01); *G06N 20/00* (2019.01); *H04L 47/22* (2013.01)

(58) Field of Classification Search
CPC ...... H04L 47/22; H04L 47/365; H04W 28/06; G06N 20/00
See application file for complete search history.

(56) References Cited

U.S. PATENT DOCUMENTS

| 7,492,789 | B2 | 2/2009 | Shvodian |
| 7,684,440 | B1 | 3/2010 | Maufer et al. |
| 8,094,550 | B2 | 1/2012 | Winter |
| 9,198,197 | B2 | 11/2015 | Kneckt et al. |
| 9,584,407 | B2 * | 2/2017 | Martin ............... G06F 11/2002 |
| 9,860,184 | B2 * | 1/2018 | Briscoe .................. H04L 47/31 |

(Continued)

OTHER PUBLICATIONS

U.S. Appl. No. 15/857,221, Non Final Office Action dated 12 Jun. 12, 2019, 15 pages.

(Continued)

*Primary Examiner* — Ahmed Elallam
(74) *Attorney, Agent, or Firm* — Han Santos, PLLC

(57) ABSTRACT

The present disclosure describes a method for characterizing a maximum frame size in a network data transmission with a feedback loop. A source device transmits a set of current frames with an initial frame size to a designation device, and receives returning frames from the designation device via a loopback interface. The frame size of subsequent frames to be transmitted is adjusted in bytes. The adjustment of the frame size may be based on a predetermined condition related to the returning frames. The maximum value of the frame size satisfied with the predetermined condition may be designated as the maximum frame size. A plurality of algorithms and machine learning may be used to project the frame size of the subsequent frames and obtain a precise value of the maximum frame size in a network route.

20 Claims, 6 Drawing Sheets

(56) References Cited

U.S. PATENT DOCUMENTS

| | | |
|---|---|---|
| 10,050,898 B2 * | 8/2018 | Martin ................... H04L 41/12 |
| 10,440,082 B1 * | 10/2019 | Winston ............. H04N 21/2387 |
| 10,523,575 B2 * | 12/2019 | Cagle ................... H04L 47/365 |
| 10,541,899 B2 * | 1/2020 | Xue ........................ H04L 47/36 |
| 10,834,007 B2 * | 11/2020 | Martin ................... H04L 67/12 |
| 2003/0101387 A1 | 5/2003 | Lee |
| 2004/0240453 A1 | 12/2004 | Ikeda et al. |
| 2012/0155518 A1 | 6/2012 | Nakamura et al. |
| 2015/0189659 A1 | 7/2015 | Mussot |

OTHER PUBLICATIONS

U.S. Appl. No. 15/857,221, Notice of Allowance dated Aug. 22, 2019, 20 pages.

* cited by examiner

FEEDBACK LOOP FOR FRAME MAXIMIZATION

RELATED APPLICATIONS

The present application is a continuation application of U.S. patent application Ser. No. 15/857,221, filed Dec. 28, 2017, titled "Feedback Loop for Frame Maximization," which claims the benefit of priority to U.S. Provisional Patent Application No. 62/529,378 titled "Feedback Loop for Frame Maximization" filed Jul. 6, 2017. patent application Ser. No. 15/857,221 and Provisional Patent Application No. 62/529,378 are hereby incorporated in their entireties by reference.

BACKGROUND

Network communications may transfer data by breaking data into smaller pieces, or data packets, to avoid clogging communication channels. Communication protocols such as Internet Protocol (IP) may further encapsulate the data packets into frames to include additional information and/or ensure data integrity. Data may be transmitted and received, in the form of frames, across one or more networks by proper network devices. The size of the largest data packet that can be communicated in a single network route may be referred as maximum transmission unit (MTU). Due to the encapsulation of data packets, the MTU size is related to, but may not be identical to, the maximum frame size that may be transported on a specific layer of a communication protocol.

Network device manufactures may set different default MTU sizes in hardware which may not be configurable. Network service providers may also set the MTU size to a size not matching those specified by network hardware devices. In addition, network service providers may add overheads in Ethernet frames such as multiprotocol label switching (MPLS) and 802.1Q (Q-in-Q) which reduce the overall MTU size available for data packets. The information related to the MTU size may not be known in advance or readily available before users send data. If the MTU size is too low in a network route compared to the size of data packets in a transmission, frames may be dropped, causing a delay of subsequent data packets and an increase of latency. Larger data packets may be desirable for an efficient transmission since each frame can carry more data than overheads.

The RFC 2544 standard provides methodologies using a set of predefined frame sizes to evaluate network performance including throughput, frame loss and latency. However, RFC 2544 does not provide enough granularity to characterize a precise value of maximum frame size in a network data transmission. The learning of a precise maximum frame size may be essential for a proper configuration of a network or an end-to-end network design. Transferring data across networks at the precise maximum frame size may allow network service providers to gain a competitive edge.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
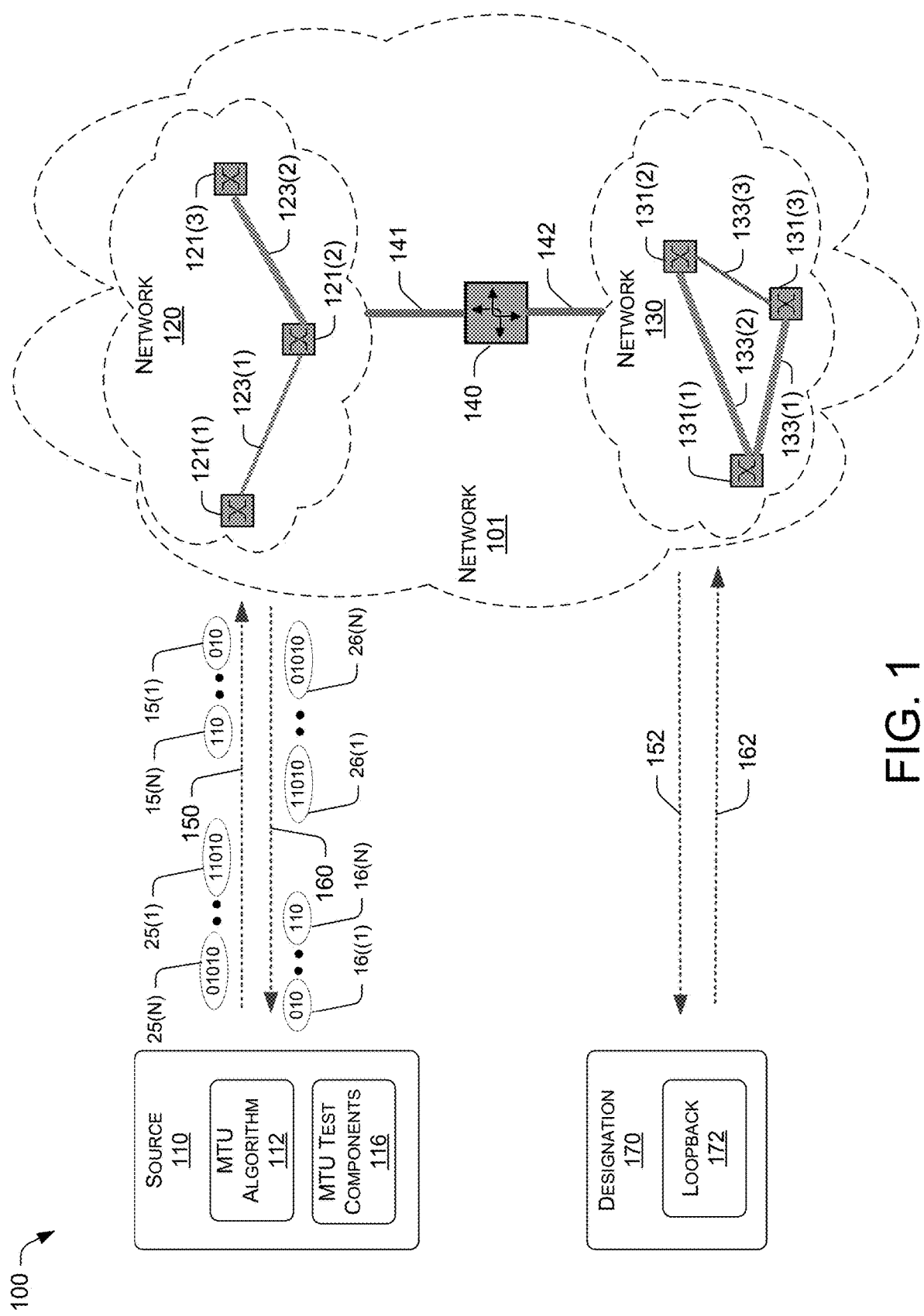
FIG. 1 is a diagram illustrates an example architecture in which a feedback loop is utilized for frame size maximization during a data transmission in accordance with embodiments of the present disclosure.

The present disclosure described herein provides communications for network devices across a communication channel and techniques for identifying a maximum frame size for a data stream roaming between networks. Advantageously, sending data with the maximum frame size may allow network devices to reduce latency of the transmission and may move a larger amount of data in a shorter time.

Typically, applications or services in a source device may send data, at a default MTU size according to a network communication protocol, to a far-end designation device. The data transmission path from the source device to the designation device may include a plurality of network devices such as bridges, switches, access points and routers that receive the data from an upstream network device and then transmit the data to a downstream network device. The MTU sizes configured in some network devices may be lower than the MTU size of sent data, causing adverse effects on the data transmission due to the smallest MTU constriction along the data transmission path. The transmitted frames in the sent data may be dropped and a re-transmission may be needed if the MTU size of sent data is larger than the smallest MTU size.

In some embodiments of the present disclosure, a maximum frame size along a network data transmission path may be discovered by dynamically adjusting the frame size of the transmitted frames and concurrently examining the returning frames which may be sent back from the designation via a feedback loop mechanism. Finding the maximum frame size may start with sending a first set of frames formatted with an initial frame size at or substantially close to a committed information rate (CIR). The initial frame size may be received from a user or defined by one or more applications, and may be bounded within a minimum and a maximum boundary values. The transmitted first set of frames may be reflected back (loopback) as loopback frames to the source device by a loopback device at the designation, and a condition of the loopback frames related to frame loss or a drop rate of the loopback frames may be assessed (e.g., by a test server and/or the source device). The condition of the loopback frames may be no frame loss, no greater than one frame loss, or less than a maximum threshold of a drop rate which may be calculated for the loopback frames. If a predetermined frame-loss condition is satisfied for the first set of frames (e.g., the frame loss of the first set of frames is less than a predetermined drop rate), then the frame size may be incremented for a second set of frames to be sent. The increment of the frame size may be based on one of a plurality of tuning algorithms which may include a linear increment, a polynomial increment, a spline increment, an exponential increment and a binary search of the incremental size. The increment of the frame size may be continued until a predetermined frame-loss condition is not met for the loopback frames. Thus, the maximum frame size may be determined by reverting to the previous frame size or by decrementing to a frame size at which the drop rate is acceptable. The process of characterizing the maximum frame size may be terminated when the frame size is incremented above a predefined maximum value or decremented below a predefined minimum value.

In some embodiments, the transmitted frames may bear one of a plurality of test patterns for characterizing the maximum frame size under effects associated with different test patterns. The test patterns may include a repetitive pattern of frames with a fixed interframe gap, a burst pattern of frames with a minimal interframe delay, or a random pattern of frames with irregular interframe gaps. The test patterns may be subject to a duration which may specify a time period for accommodating a desired number of frames and interframe gaps.

In some embodiments, data in the form of frames may be transmitted at a plurality of transmission rates other than the CIR rate for characterizing a plurality of maximum frame sizes associated with the transmission rates respectively. Dependency information of the plurality of maximum frame sizes on the transmission rates may be collected for machine learning.

In some embodiments, the initial frame size may be the minimum value received from a user or an application. In other embodiments, the initial frame size may be projected from machine learning based on dependency information of maximum frames sizes on the transmission rates. The approach of projecting the initial frame size from machine learning may shorten the time to find the maximum frame size compared to an initial frame size assigned with a minimum value.

In some embodiments, the size of increment or decrement of the frames to be transmitted may be based on machine learning instead of relying on a tuning algorithm. The approach of adjusting frame size from machine learning may also shorten the time to find the maximum frame size compared to incrementing of the frame size by applying one of the tuning algorithms.

FIG. 1 is a diagram illustrating an example architecture 100 in which the method of finding a maximum frame size in a network route described above may be implemented. In FIG. 1, architecture 100 may include a source 110, a designation 170, and a network 101. Either or both of source 110 and designation 170 may be a computing device, a laptop, a cell phone, a router, a smart TV, or a test device capable of communicating with network 101 via a wired or wireless communication channel Source 110 may send forwarding data 150 as frames to designation 170 across network 101. Forwarding data 150 may pass through network 101 as forwarding data 152 which may be received by designation 170. Designation 170 may reflect forwarding data 152 back via loopback 172 as returning data 162 which may further pass through network 101 again and received by source 110 as returning data 160. As depicted in architecture 100, forwarding data 150 may include a plurality of sets of forwarding frames such as a first set of forwarding frames 15(1)-15(N) and a second set of forwarding frames 25(1)-25(N), where N is a positive integer. Any subsequent sets of forwarding frames are not shown in architecture 100 but may be otherwise assumed to exist if necessary. Returning data 160 may include, under a condition of no frame loss, a plurality of sets of returning frames such as a first set of returning frames 16(1)-16(N) and a second set of returning frames 26(1)-26(N). Any subsequent sets of returning frames are not shown in architecture 100 but may be otherwise assumed to exist if necessary. Source 110 may contain MTU test components 116 which may set an initial frame size, time constraints, and a test pattern for the forwarding frames. Thus, the first set of forwarding frames 15(1)-15(N) may be formatted with the initial frame size and a duration for N repetitive frames as shown in FIG. 1. The time constraints for forwarding frames may include a wait time after sending the first set of forwarding frames 15(1)-15(N) to determine whether source 110 receives the first set of returning frames 16(1)-16(N) upon expiration of the wait time. Upon expiration of the wait time, a condition of the first set of returning frames 16(1)-16(N) related to frame loss may also be assessed (e.g., by source 110 or a test server (not shown)). As illustrated in architecture 100 in which no frame loss occurs in the transmission of the first set of returning frames 16(1)-16(N), the frame size of the second set of forwarding frames 25(1)-25(N) may be incremented according to MTU algorithm 112. The incrementing of the frame size may be continued for subsequent sets of forwarding frames if a predetermined frame-loss condition is satisfied. The predetermined frame-loss condition may include no frame loss, no greater than one frame loss, or less than a maximum threshold of a drop rate of the loopback frames.

Network 101 may include one or more networks which may be provided by different network service providers and may have different configurations of the MTU sizes for network devices within the domain of network 101. As illustrated in FIG. 1, network 101 may be composed of network 120 and network 130 for illustrative purposes. Each of network 120 and network 130 may include one or more network devices. For an illustrative purpose without redundancy, network 120 as shown in FIG. 1 may include network devices 121(1)-121(3) and network segments 123(1)-123(2). Similarly, network 130 may include network devices 131(1)-131(3) and network segments 133(1)-133(3). Network 120 and network 130 may be connected by a network device 140 and network segments 141 and 142.

Either or both of network 120 and network 130 may be a local area network (LAN), a wide area network (WAN), a metro area network (MAN), or a combination thereof. Either or both of network 120 and network 130 may be a radio access network employing time division multiple access (TDMA), code division multiple access (CDMA), high speed packet access (HSPA), or long term evolution (LTE) networking standards.

In a sense, networks 101, 120 and 130 are also the subjects for testing. Loopback testing is generally, but not always, with respect to layer 2 transport. Since microwave and satellite physical mediums as well as SONET and SDH may transport layer 2, networks 101, 120 and 130 may comprise microwave, satellite, SONET and SDH. In general networks 101, 120 and 130 may comprise any transport of layer 2 protocol data.

Network devices 121(1)-121(3) and network devices 131(1)-131(3) may send and receive frames on a specific layer of a communication protocol within the respective network. For example, network devices 121(1)-121(3) and 131(1)-131(3) may be implemented as switches and may process frames using layer 2 (data link layer) protocols in Open System Integration (OSI) reference model within network 120. Communications between network 120 and network 130 via network device 140 may use a different protocol other than the layer 2 OSI protocol. Network device 140 may be one or more routers commonly used for communications between networks and may be configured to communicate with a layer 3 (network layer) OSI protocol. The network segments 123(1)-123(2) and 123(1)-123(3) may correspond to communication channels between network devices and may have different MTU sizes respectively. The different MTU sizes of network segments 123(1)-123(2) and 133(1)-133(3) may be represented as different widths of the line segments. For example, the width of network segment 123(2) is wider than that of network segment 123(1) as illustrated in FIG. 1, and network segment 123(2) may correspond to a communication channel with a larger MTU size than network segment 123(1).

Exemplary Implementation

Figure 2:
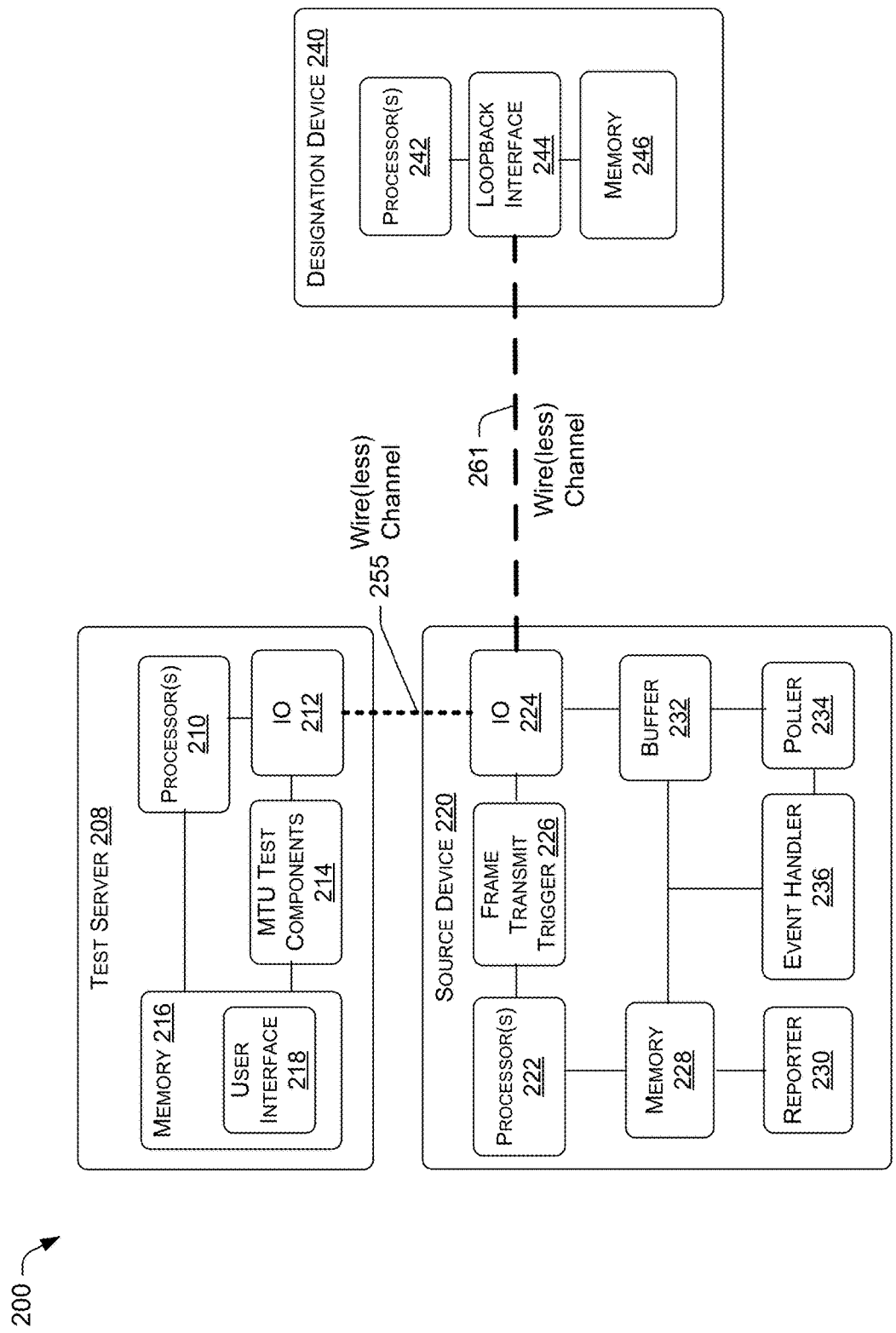
FIG. 2 is a block diagram illustrating an example implementation of a feedback loop for frame size maximization in accordance with embodiments of the present disclosure.

FIG. 2 is a block diagram of an example implementation 200 illustrating devices and components that may be involved in finding the maximum frame size in a data transmission. Example implementation 200 may perform various functions related to techniques, methods, apparatuses and systems described herein, including those described above with respect to example architecture 100 as well as those described below with respect to example processes 300, 400, 500 and 600.

In one embodiment of the present disclosure, example implementation 200 may include a test server 208, a source device 220 and a designation device 240. Test server 208 may include one or more processors 210, a memory 216, and at least an input/output (IO) port 212. Test server 208 may be a local computer or a local host in the same network with source device 220, or test server 208 may be a remote computer or a remote host in a different network. Test server 208 may provide necessary MTU test components 214 to source device 220 for finding a maximum frame size or MTU size in a data transmission in the form of frames. Some of MTU test components 214 may be entered through a user interface 218 stored in memory 216. The MTU test components 214 may include a plurality of initial data packet sizes or initial frame sizes, a plurality of lower-limit and upper-limit values of data packet sizes or frame sizes, all of which may be associated with a plurality of transmission rates respectively. The MTU test components 214 may further include a plurality of test patterns such as a repetitive pattern, a burst pattern, and a random pattern. A repetitive pattern may be a set of frame with a fixed interframe gap. A burst pattern may be a set frames with a minimal interframe gap. A random pattern may be a set of frames with irregular interframe gaps. The MTU test components 214 may further include time constraints for transmitting a set of frames. The time constraint may include a wait time and a duration. A wait time after a transmission of a set of frames may be needed to receive the returning frames from far-end designation device 240 due to latency in the transmission. A duration may be a time period for a desired number of frames and interframe gaps.

Test server 208 may communicate with source device 220 via a communication channel 255 connecting IO 212 in test server 208 and IO 224 in source device 220. The communication channel 255 may be a wired channel or a wireless channel. In one implementation of the present disclosure, test server 208 may be a host in a core network of a network service provider and source device 220 may be a subscriber's device. Network service provider may characterize a precise value of the maximum frame size for a data transmission from the subscriber's device to the core network by uploading the necessary test components to the subscriber's device via a wired channel or a wireless channel.

Source device 220 may include one or more processors 222 and a memory 228 storing instructions and test components necessary for characterizing the maximum frame size. Source device 220 may use test data generated from an internal application or may receive test data from a user or test server 208. The one or more processors 222 may process the test data according to one or more communication protocols such as Transmission Control Protocol (TCP) and IP as a precursor for setting up a test loopback. The test data may be divided into data packets by TCP and the data packets may be encapsulated into frames by IP. The encapsulation of data packets may be considered overheads but may be needed to include additional information or to ensure data integrity. Source device 220 may include a frame transmit trigger to start and terminate the frame transmission upon qualifying events as such described in example processes 300, 500, and 600 described below. The transmitted frames may be reflected back from designation devices 240 and store in a buffer 232. Source device 220 may include a poller 234 that periodically checks whether the returning frames from designation device 240 arrives or not. The poller 234 may poll buffer 232 upon expiration of a wait time after a transmission of a set of frames. The poller 234 may trigger an event handler 236 upon a complete reception of returning frames in the buffer 232. The event handler 236 may call for the one or more processors 222 to determine a drop rate of the returning frames.

The memory 228 may further store MTU tuning algorithm 112, and the one or more processors 222 may determine an increment or a decrement of the frame size for subsequent frames to be transmitted according to MTU algorithm 112. In another embodiment of the present disclosure, the one or more processors 222 may consult test server 208 for a new frame size based on MTU size dependency information stored in MTU test components 214. Once a new frame size or a MTU size is determined, the one or more processors 222 may generate new data packets and frames based on the new MTU size or the new frame size. Source device 220 may include a reporter that may report and collect test results and network configurations for machine learning.

Designation device 240 may include one or more processors 242, a memory 246, and a loopback interface 244. The loopback interface 244 may swap a source media access control (MAC) address and a designation MAC address in the frames received from source device 220. The loopback interface 244 may further send the frames in which the source MAC address and designation MAC address are swapped back to source device 220. Those frames sent back to source device 220 by loopback interface 244 may be referred as loopback frames. The loopback interface 244 may be implemented as a software loop, a hardware loop, or a virtual loop. A software loop may be a set of protocols that emulate the functions of a hardware. A hardware loop may be a physical connection between source device 220 and designation device 240. Source device 220 may send frames to designation device 240 via a communication channel 261 and vice versa. The communication channel 261 may be a wired channel, a wireless channel, and may be implemented as network 101 in example architecture 100.

Exemplary Algorithm

Figure 3:
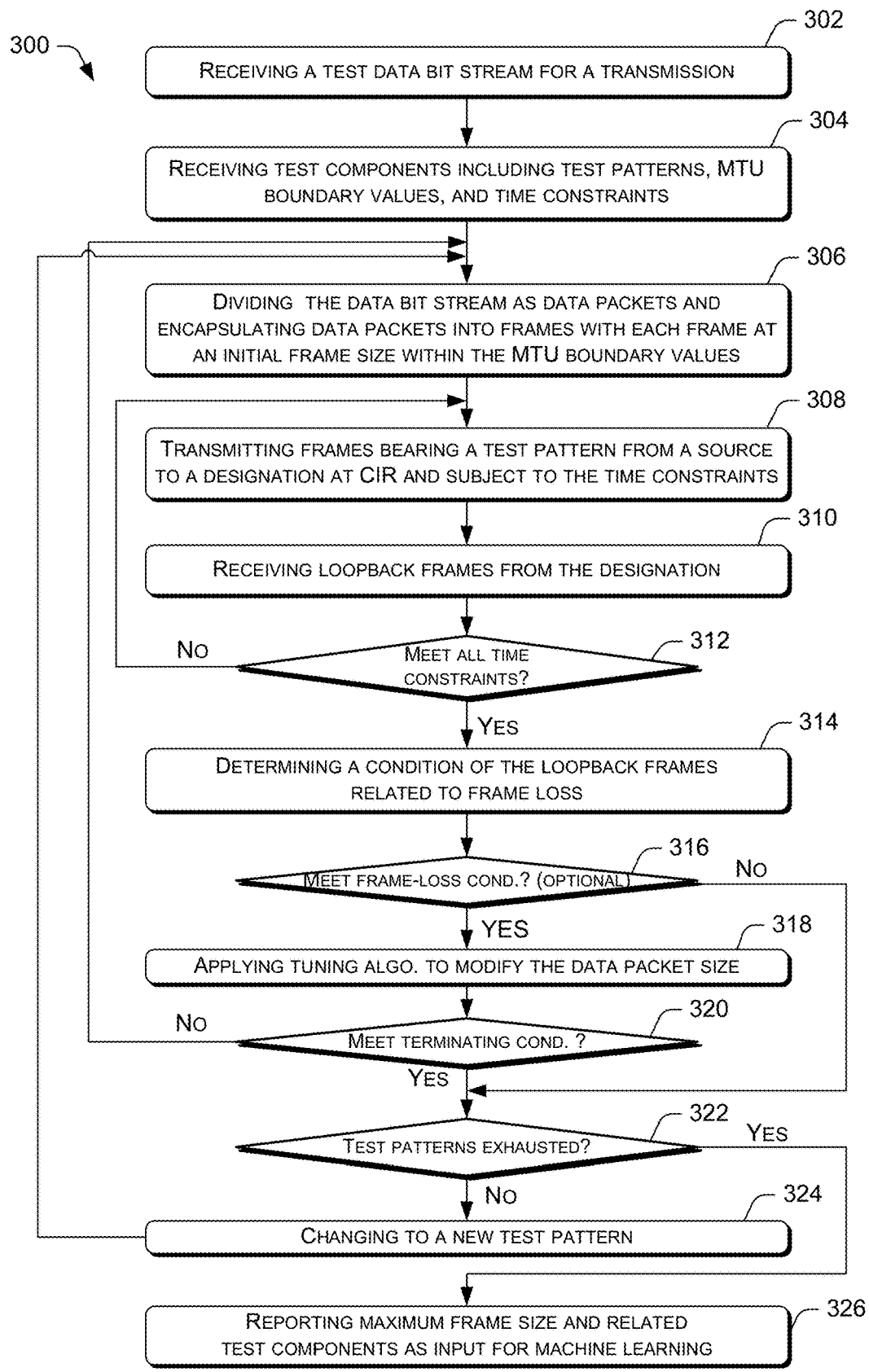
FIG. 3 is a flow diagram of an example algorithm utilizing a feedback loop for frame size maximization in accordance with embodiments of the present disclosure.

FIG. 3 depicts an example algorithm 300 in accordance with embodiments of the present disclosure. Algorithm 300 may be implemented with devices and components described in example implementation 200. Although illustrated as discrete blocks, various blocks of algorithm 300 may be divided into additional blocks, combined into fewer blocks, or eliminated, depending on the desired implementation.

Algorithm 300 pertains to characterization of a maximum frame size in a network route with a feedback loop. Algorithm 300 may begin at 302. At block 302, source device 220 may receive a test data bit stream to be processed for frame generation. The test data bit stream may be entered by a user or supplied from an application. Algorithm 300 may proceed from 302 to 304. At block 304, source device 304 may receive MTU test components 214, either defined by a user or provided by test server 208. The MTU test components 214 may include parameters such as test patterns, MTU boundary values and time constraints related to the frame transmission. The test patterns may include a repetitive pattern, a burst pattern and a random pattern as described in the section of example implementation 200. The MTU boundary values may include a lower-limit value and an upper-limit value which may correspond to the lower and upper limit of the MTU size allowed in the process of characterizing the maximum frame size. An initial data packet size within the MTU boundary values may be selected. In one embodiment of the present disclosure, the initial data packet size may be the lower-limit value. The MTU test components 214 may further include time constraints for the frames to be transmitted. The time constraints may include a wait time and a duration as described in the section of example implementation 200. Algorithm 300 may proceed from 304 to 306.

At block 306, the test data bit stream may be processed by processor(s) 222 using a communication protocol such as TCP to break the test data bit stream into data packets with an initial data packet size, and the data packets may be further encapsulated to create a set of frames according to another communication protocol such as IP. The encapsulation of data packets may add overhead information in frames. The overhead information may include source and designation MAC addresses, frame sequence bits for assigning sequence numbers of frames, and error correcting bits for ensuring data integrity. Algorithm 300 may proceed from 306 to 308.

At block 308, source device 220 may transmit the set of frames bearing a test pattern to designation device 240 at or substantially close to the CIR transmission rate (e.g., within 10% of the CIR transmission rate). The transmission rate may be defined by a user regarding how much deviation from CIR may be allowed, for example, within a 10% range of CIR. The frame transmission may be subject to the wait time and the duration constraints specified at block 304. Algorithm 300 may proceed from 308 to 310.

At block 310, source device 220 may receive a set of loopback frames from designation device 240. The loopback frames may be the set of the transmitted frames reflected back by a loopback interface 244 at designation device 240. Algorithm 300 may proceed from 310 to 312. At decision block 312, processor(s) 222 may determine whether the frame transmission of the set of frames meets all the time constraints. If a duration specified to send N frames is not expired, the frame transmission may continue until the last frame is sent. The frame transmission may be paused after the duration constraint is satisfied. A wait time may be needed for source device 220 to receive the set of loopback frames due to the latency of round-trip frame transmission. Algorithm 300 may proceed from 312 to 314 in an event that it is determined that the frame transmission of the set of frames meets all the time constraints. Otherwise, algorithm 300 may proceed from 312 to 306.

At block 314, processor(s) 222 may determine a condition related to frame loss of the loopback frames after all the time constraints have been met in the frame transmission. The condition related to frame loss may be no frame loss, no greater than one frame being dropped, or less than a maximum threshold of a drop rate of loopback frames. Algorithm 300 may proceed from 314 to 316.

At decision block 316, actions may be performed following whether a predetermined condition related to frame loss occurs. Algorithm 300 may proceed to block 318 in response to an existence of a predetermined frame-loss condition. Otherwise, algorithm 300 may proceed from 316 to 322. For example, if the predetermined frame-loss condition is a condition of no frame loss, algorithm 300 may proceed to block 318 only if the set of loopback frames received by source device 220 have not lost any frames during the transmission. There may be situations that a user or a service provider may need to collect information of a plurality of frame drop rates associated with data packet sizes respectively. In those situations, regardless of any frame-loss condition, block 316 may be ignored and algorithm 300 may proceed to block 318 directly.

At block 318, processor(s) 222 may apply a tuning algorithm to modify the initial data packet size to a new data packet size. Algorithm 300 may proceed from 318 to 320. At block 320, a predefined terminating condition for the frame transmission may be checked. If the predefined terminating condition is not met, algorithm 300 may return to block 306. The test data bit stream may be re-divided into data packets with the new data packet size and the new frame may be generated be re-encapsulating new data packets. If the predefined terminating condition is met at block 320, algorithm 300 may proceed to block 322. The predefined terminating condition may be a condition related to the data packets having a size exceeding the upper-limit value or smaller than the lower-limit value.

If a predetermined frame-loss condition at block 316 does not exist, algorithm 300 may proceed to decision block 322 to determine whether all the test patterns have been characterized. Algorithm 300 may return to block 306 for a new test pattern or may proceed to block 326 if all the test patterns have been characterized.

At block 326, a reporter 230 may report the maximum data packet size or the maximum frame size at which a predetermined frame-loss condition may be satisfied. For example, the maximum data packet size or the maximum frame size without any frame loss may be designated as the MTU size or the maximum frame size respectively when the predetermined frame-loss condition is a condition of no frame loss. The reporter 230 may collect the MTU size and the maximum frame size associated with the test configuration for machine learning.

Loopback Process

Figure 4:
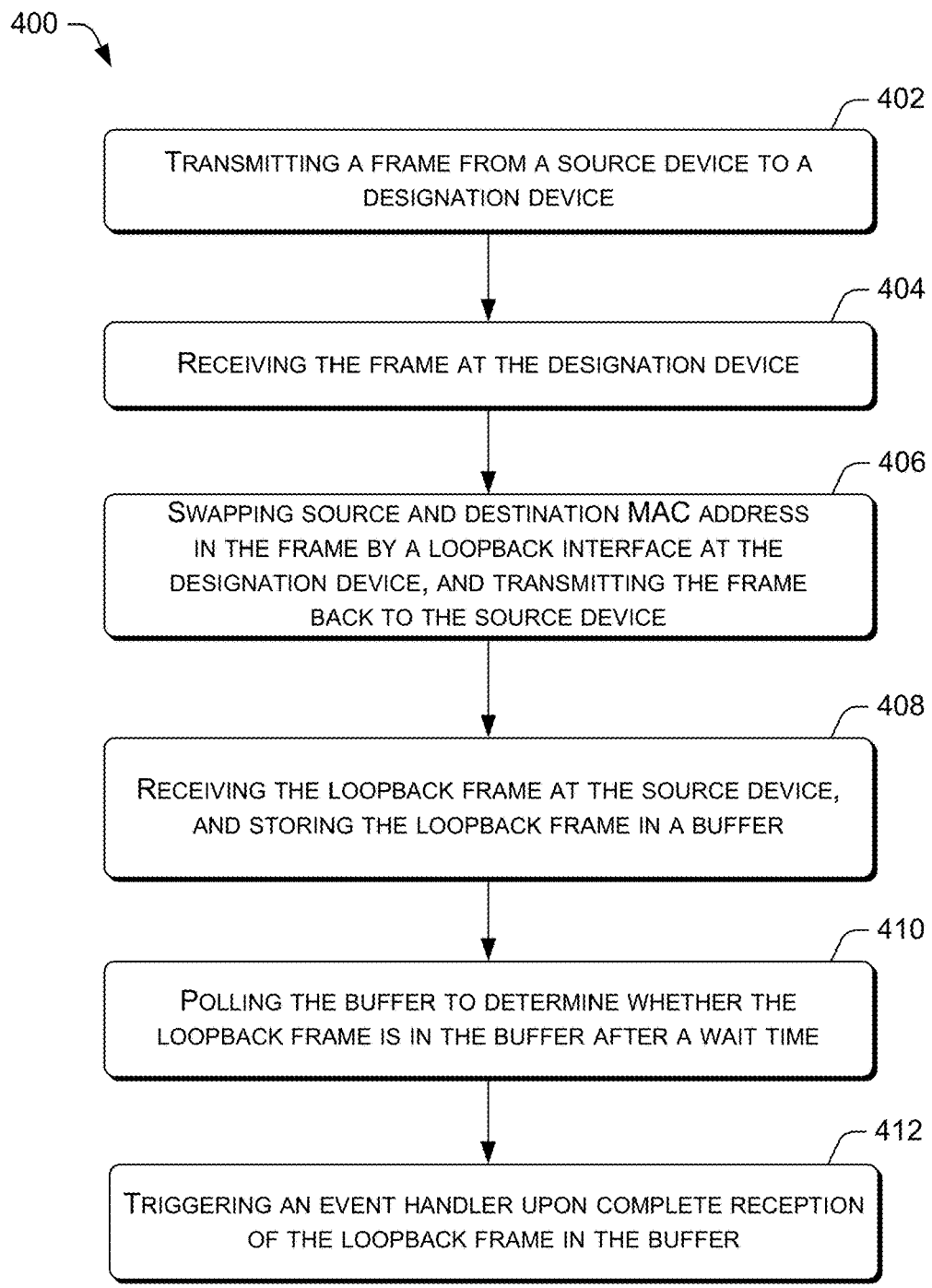
FIG. 4 is a flow diagram of an example feedback loop process for frame size maximization in accordance with embodiments of the present disclosure.

FIG. 4 is a flow diagram of an example process 400 illustrating a feedback loop process utilized for frame size maximization. Process 400 may be implemented with devices and components described in example implementation 200 in accordance with the present disclosure. Process 400 may be illustrated by a one-frame loopback process.

However, process 400 may be applied to a transmission with a set of frames bearing any pattern. Process 400 may begin at 402.

At block 402, source device 220 may transmit a frame to designation device 240. Process 400 may proceed from 402 to 404.

At block 404, designation device 240 may receive the frame from source device 220. Process 400 may proceed from 404 to 406.

At block 406, a loopback interface 244 at designation device 240 may swap source and designation MAC address in the received frame. The swapping of source and designation MAC address may cause the received frame to be sent back to source device 220. Process 400 may proceed from 406 to 408.

At block 408, source device 220 may receive a loopback frame from designation device 240. The loopback frame may refer to a frame that originates from and returns to the same device. Source device 220 may store the loopback frame in a buffer 232. Process 400 may proceed from 408 to 410.

At block 410, a poller 234 may poll the buffer 232 to determine whether the loopback frame is in the buffer 232 after a wait time as described in block 304 of example algorithm 300. Process 400 may proceed from 410 to 412.

At block 412, an event handler 236 may be triggered upon a complete reception of the loopback frame in the buffer 232. The event handler 236 may call for processor(s) 222 to determine whether to increment the frame size or to decrement the frame size.

Exemplary Use Case 1

Figure 5:
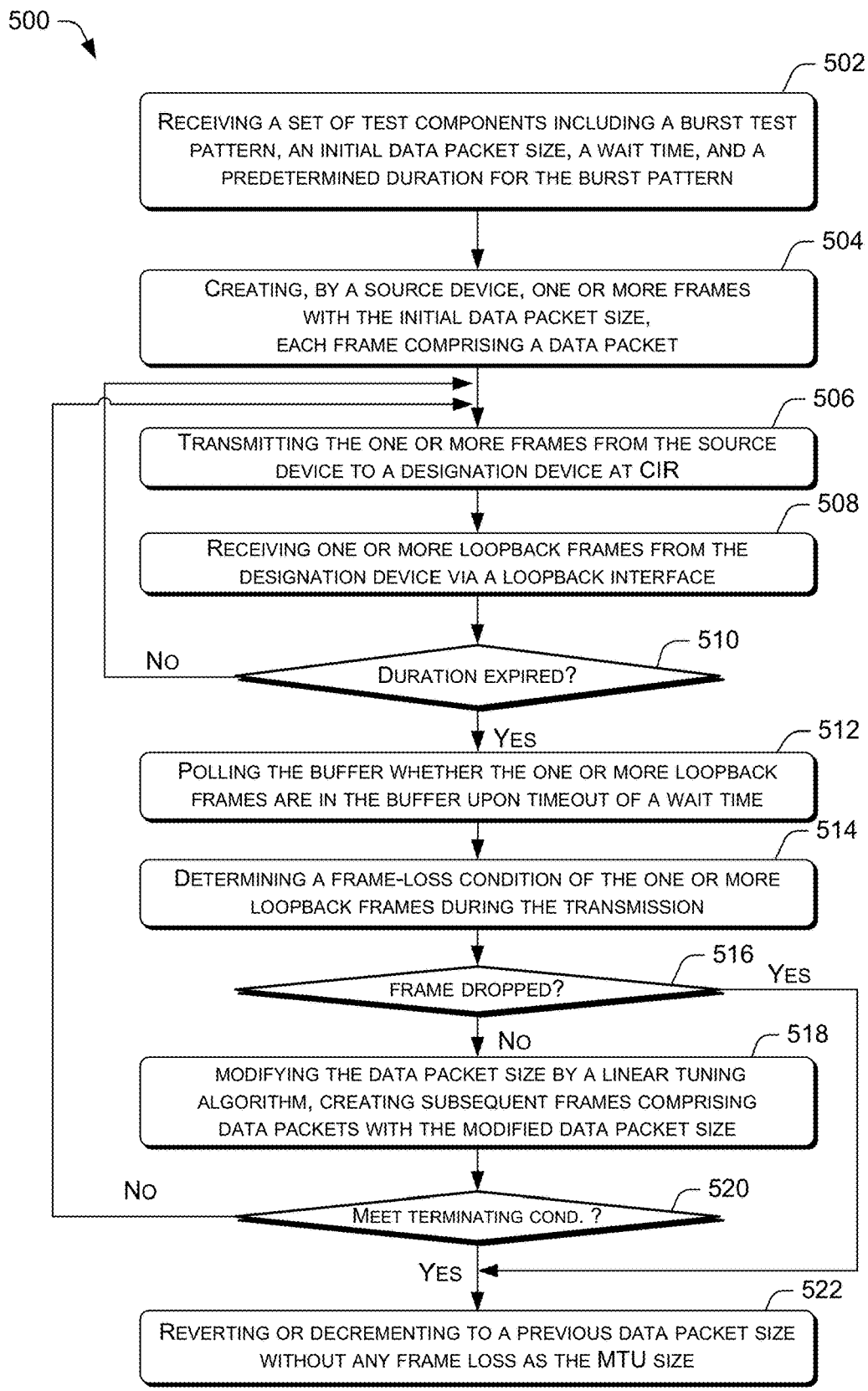
FIG. 5 is a flow diagram of an example process of using a tuning algorithm to adjust the frame size during a data transmission in accordance with embodiments of the present disclosure.

FIG. 5 is a flow diagram of an example process 500 illustrating an exemplary use case of frame size maximization in accordance with one embodiment of the present disclosure. Process 500 may be implemented with devices and components described in example implementation 200. Process 500 may be an implementation of example algorithm 300 using a specific set of test components (i.e. a specific test pattern and a specific tuning algorithm) to characterize a maximum frame size in a data transmission in the form of frames. Process 500 may begin at 502.

At block 502, source device 220 may designate a specific set of test components for finding a maximum frame size in a network route with a feedback loop. The specific set of test components may include a burst pattern, an initial data packet size, a wait time, and a predetermined duration for the burst pattern. The specific set of test components may further include a linear increment or decrement of the data packet size in response to an existence of a predetermined condition related to frame loss. The predetermined frame-loss condition in process 500 may be a condition of no frame loss. The specific set of test components may further include a lower-limit value and an upper-limit value for the data packet size, the frame transmission may be terminated if the data packet size is not bounded within the lower-limit value and the upper-limit value. Process 500 may proceed from 502 to 504.

At block 504, source device 220 may create a burst pattern of one or more frames formatted with the initial data packet size according to some communication protocols such TCP/IP. Each frame may contain a data packet and overhead information encapsulated by a communication protocol. Process 500 may proceed from 504 to 506.

At block 506, source device 220 may first establish a communication channel with designation device 240. The communication channel may be a wired channel, a wireless channel, or a combination thereof between source device 220 and designation device 240. Source device 220 may then transmit the one or more frames to designation device 240 at CIR. Process 500 may proceed from 506 to 508.

At block 508, source device 220 may receive one or more loopback frames which are reflected frames of the one or more transmitted frames sent back by designation device 240. Designation device 240 may swap source and designation MAC address in the one or more loopback frames via a loopback interface 244. Source device 220 may store the one or more loopback frames in buffer 232. Process 500 may proceed from 508 to 510.

At decision block 510, the transmitting of the one or more frames by source device 220 may continue until the last frame is sent within the predetermined duration. Upon expiration of the predetermined duration, the frame transmission may be paused prior to transmitting subsequent frames. Process 500 may proceed from 510 to 512 in an event that it is determined that the duration has expired. Otherwise, process 500 may proceed from 510 to 506.

At block 512, a poller 234 may poll the buffer 232 to determine whether the one or more loopback frames are in the buffer 232 upon timeout of the wait time. Process 500 may proceed from 512 to 514.

At block 514, processor(s) 222 may be called for to determine a condition related to frame loss of the one or more loopback frames in the buffer 232. Process 500 may proceed from 514 to 516.

At decision block 516, the frame-loss condition of the one or more loopback frames may be determined. Process 500 may proceed to 518 in response to a condition of no frame loss, or may proceed to block 522 if the frame transmission has lost one or more frames.

At block 518, the data packet size of subsequent frames to be sent may be modified in response to a condition of no frame loss of the one or more loopback frames. For example, if a condition of no frame loss occurs, a linear increment of the data packet size may be carried out in creating the subsequent frames to be transmitted. Process 500 may proceed from 518 to 520.

At decision block 520, example process 500 may compare the modified data packet size with the lower-limit value and the upper-limit value and determine whether to terminate or continue the frame transmission. If the modified data packet size is bounded within the lower-limit value and the upper-limit value, process 500 may return to 506 and continue. If the modified data packet size is smaller than the lower-limit value or greater than the upper-limit value, the frame transmission in example process 500 may be terminated and process 500 may proceed to 522.

At block 522, the data packet size may be reverted or decremented to a previous data packet size without any frame loss upon a decision of "yes" at block 516. The data packet size at which no frame loss occurs in a frame transmission at the CIR may be designated as the MTU size.

Exemplary Use Case 2

Figure 6:
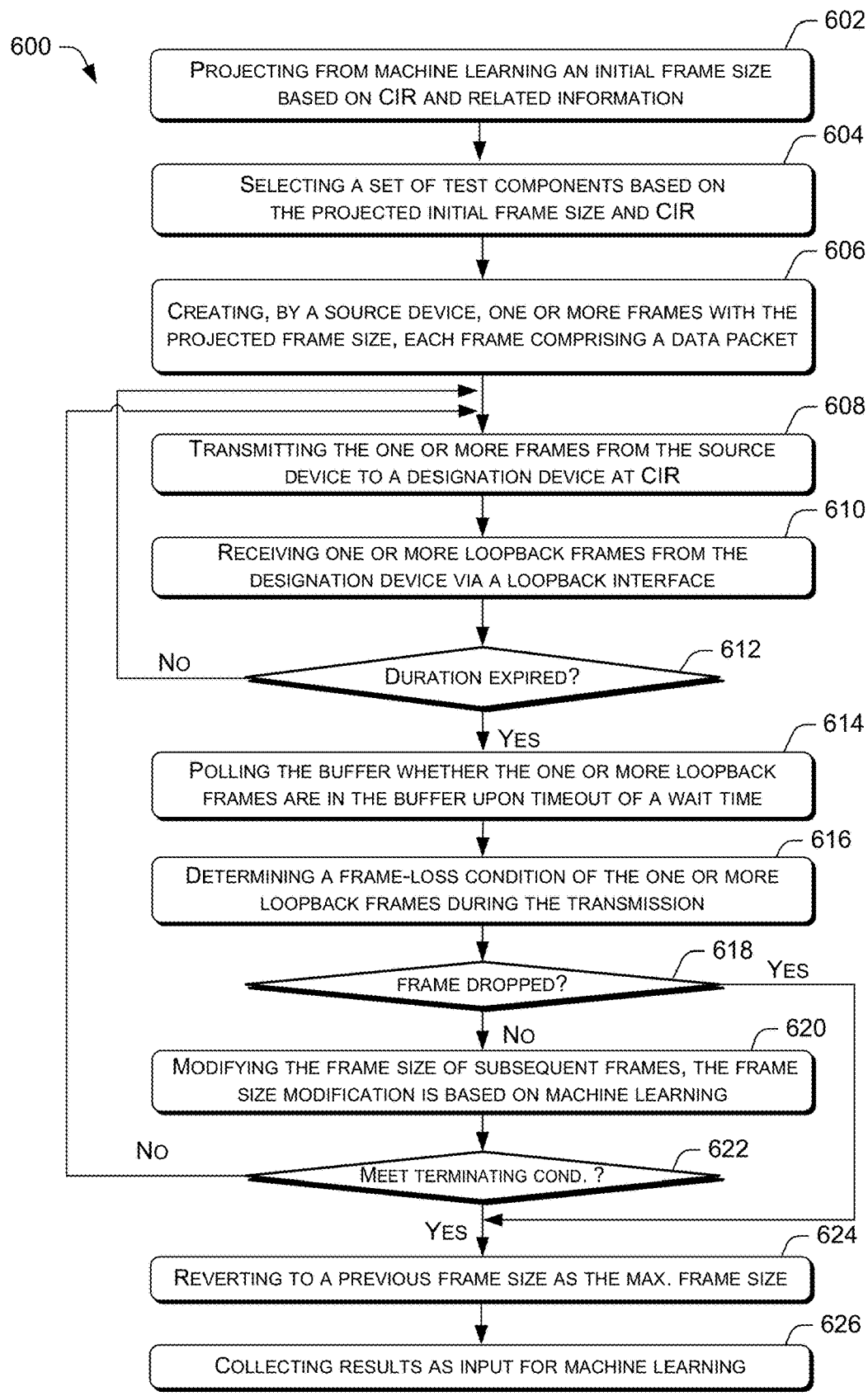
FIG. 6 is a flow diagram of an example process based on machine learning to determine maximum frame size during a data transmission in accordance with embodiments of the present disclosure.

FIG. 6 is a flow diagram of an example process 600 illustrating an exemplary use case of frame maximization in accordance with one embodiment of the present disclosure. Process 600 may be implemented with devices and components described in example implementation 200. Process 600 may characterize a maximum frame size in a data transmission in the form of frames based on machine learning. Process 600 may being at 602.

At block 602, an initial frame size may be projected from machine learning based on a CIR of the communication channel between source device 220 and designation device 240. MTU test components 214 in test server 208 may store information of a plurality of maximum frame sizes associated with transmission rates and test configurations. Processor(s) 210 in test server 208 may select the initial frame size from MTU test components 214 based on the network configuration and the CIR information. The selected initial frame size may be in the vicinity of a stored maximum frame size associated with the CIR to accelerate the characterization process. Process 600 may proceed from 602 to 604.

At block 604, other test components such as a pattern of frames, a wait time, a duration, a predetermined frame-loss condition, and a tuning algorithm for frame size increment may be selected based on the initial frame size and the CIR. The predetermined frame-loss condition may be no frame loss and the tuning algorithm for frame size increment may be also based on the machine learning in this exemplary user case of example process 600. The test components may further include a lower-limit value and an upper-limit value for the initial frame size. Process 600 may proceed from 604 to 606.

At block 606, one or more frames may be created by source device 220 according to parameters decided at block 602 and block 604. Process 600 may proceed from 606 to 608.

At block 608, source device 220 may initiate a frame transmission sending the one or more frames to designation device 240. Each frame of the one or more frames may contain a data packet and additional overhead information. Process 600 may proceed from 608 to 610.

At block 610, source device 220 may receive one or more loopback frames which are reflected frames of the one or more transmitted frames sent back by designation device 240. Source device 220 may store the one or more loopback frames in buffer 232. Process 600 may proceed from 610 to 612.

At decision block 612, sending of the one or more frames by source device 220 may continue until the last frame is sent within the predetermined duration. Upon expiration of the predetermined duration, the frame transmission may be paused prior to sending subsequent frames. Process 600 may proceed to 614 in an event that it is determined that the duration has expired. Otherwise, process 600 may proceed from 612 to 608.

At block 614, a poller 234 may poll the buffer 232 to determine whether the one or more loopback frames are in the buffer 232 upon timeout of a wait time. Process 600 may proceed from 614 to 616.

At block 616, processor(s) 222 may be called for to determine a condition related to frame loss of the one or more loopback frames in the buffer 232. Process 600 may proceed from 616 to 618.

At decision block 618, the frame-loss condition of the one or more loopback frames may be determined. Process 600 may proceed to 620 in response to a condition of no frame loss, or may proceed to 624 if the frame transmission has lost one or more loopback frames.

At block 620, the frame size of subsequent frames to be sent may be modified in response to a condition of no frame loss of the one or more loopback frames. For example, if a condition of no frame loss occurs, a projected increment of the frame size based on the machine learning may be carried out in creating the subsequent frames to be sent. Process 600 may proceed from 620 to 622.

At decision block 622, process 600 may compare the modified frame size with the lower-limit or upper-limit frame size and determine whether to terminate or continue the frame transmission. If the modified frame size is bounded within the lower-limit value and the upper-limit value, process 600 may return to 608 and continue. If the modified frame size is greater than the upper-limit value or smaller than the lower-limit value, the frame transmission may be terminated and process 600 may proceed to 624.

At block 624, the frame size may be reverted to a previous frame size without any frame loss upon a decision of "yes" at 618. The previous frame size at which no frame loss occurs in the frame transmission at the CIR may be designated as the maximum frame size at the CIR.

At block 626, process 600 may report the maximum frame size with which the frame transmission at the CIR may satisfy the predetermined frame-loss condition. Process 600 may further collect dependency information of the maximum frame size associated with the test components and the test configuration for machine learning.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
    initiating a data transmission in which one or more frames bearing a pattern are transmitted between a source device and a designation device, wherein each frame of the one or more frames is formatted with an initial frame size in bytes;
    receiving at least one loopback frame at the source device; and
    modifying a frame size for each frame of subsequent frames to be transmitted in response to an existence of a predetermined frame-loss condition in a received at least one loopback frame.

2. The method of claim 1, wherein the initial frame size is based on dependency information associated with a network of the data transmission between the source device and the designation device.

3. The method of claim 1, further comprising:
    receiving the initial frame size from a user.

4. The method of claim 1, further comprising:
    receiving the initial frame size from one or more applications.

5. The method of claim 1, further comprising:
    collecting dependency information of a plurality of maximum frame sizes associated with a plurality of test components respectively in the data transmission.

6. The method of claim 1, wherein the modifying of the frame size is based on machine learning.

7. The method of claim 1, wherein the predetermined frame-loss condition comprises:
    no frame loss;
    no greater than a frame of the one or more frames being dropped; or
    less than a maximum threshold of a drop rate related to the one or more frames being dropped.

8. An apparatus, comprising:
one or more processors;
a memory storing computer-executable instructions that upon execution cause the one or more processors to perform acts comprising:
receiving a set of test components;
creating one or more frames having an initial frame size and bearing one of the plurality of patterns, each frame of the one or more frames comprising a data packet;
transmitting the one or more frames to a designation device in response to a frame transmit trigger configured to start the transmitting of the one or more frames;
receiving one or more loopback frames from the designation device; and
adjusting a size of the data packet in a next set of frames to be transmitted in response to an existence of a plurality of frame-loss conditions related to the one or more loopback frames;
a buffer configured to store the one or more loopback frames;
a poller configured to determine whether the buffer receives the one or more loopback frames;
an event handler configured to call for the one or more processors to determine a drop rate of the one or more loopback frames in the buffer, wherein the determining of the drop rate is triggered by the poller in response to all of the one or more loopback frames being received in the buffer; and
a reporter configured to report a plurality of maximum frame sizes associated with the set of test components respectively.

9. The apparatus of claim 8, wherein the initial frame size is based on dependency information associated with a network of the transmission of the one or more frames.

10. The apparatus of claim 8, wherein the acts further comprise:
receiving the initial frame size from a user.

11. The apparatus of claim 8, wherein the acts further comprise:
receiving the initial frame size from one or more applications.

12. The apparatus of claim 8, wherein the acts further comprise:
collecting dependency information of a plurality of maximum frame sizes associated with a plurality of test components respectively in the transmission of the one or more frames.

13. The apparatus of claim 8, wherein the modifying of the frame size is based on machine learning.

14. The apparatus of claim 8, wherein the plurality of frame-loss conditions comprise:
no frame loss;
no greater than a frame of the one or more frames being dropped; or
less than a maximum threshold of a drop rate related to the one or more frames being dropped.

15. An apparatus, comprising:
one or more processors;
a loopback interface configured to swap a source media access control (MAC) address of a source device and a designation MAC address of a designation device in each frame of one or more frames received from the source device; and
a memory storing computer-executable instructions, wherein execution of the instructions by the one or more processors causes the one or more processors to perform acts comprising:
receiving the one or more frames from the source device; and
transmitting the one or more frames back to the source device as one or more loopback frames.

16. The apparatus of claim 15, wherein the acts further comprising: assessing a frame-loss condition of the one or more loopback frames; comparing the frame-loss condition with a predetermined drop rate; incrementing a frame size based at least upon a comparison between the frame-loss condition and the predetermined drop rate.

17. The apparatus of claim 15, wherein the loopback interface is implemented as a software loop.

18. The apparatus of claim 15, wherein the loopback interface is implemented as a hardware loop in a physical connection between the source device and the designation device.

19. The apparatus of claim 18, wherein the loopback interface is implemented as a software loop that includes protocols that emulate functions of the hardware loop.

20. The apparatus of claim 15, wherein the loopback interface is implemented as a virtual loop.

* * * * *